United States Patent [19]

Bruder

[11] Patent Number: 4,466,470

[45] Date of Patent: Aug. 21, 1984

[54] LITHIUM BATTERIES WITH ORGANIC SLURRY CATHODES

[75] Inventor: Alan H. Bruder, Burlington, Mass.

[73] Assignee: Polaroid Corporation, Cambridge, Mass.

[21] Appl. No.: 341,195

[22] Filed: Jan. 20, 1982

[51] Int. Cl.³ .............................................. B65B 3/04
[52] U.S. Cl. ..................................... 141/1.1; 252/506; 252/509; 252/512; 252/518; 429/224
[58] Field of Search ............................ 141/1.1, 32, 33; 252/506, 509, 512, 518, 521; 429/224, 194, 197, 152, 232

[56] References Cited

U.S. PATENT DOCUMENTS

| | | |
|---|---|---|
| 4,086,397 | 4/1978 | Goebel et al. ...................... 141/1.1 |
| 4,086,400 | 4/1978 | Hyland et al. . |
| 4,133,856 | 1/1979 | Ikeda et al. . |
| 4,216,247 | 8/1980 | Ikeda et al. . |
| 4,264,689 | 4/1981 | Moses . |
| 4,287,276 | 9/1981 | Lundquist et al. . |
| 4,346,022 | 8/1982 | Wollott et al. ...................... 141/1.1 |

FOREIGN PATENT DOCUMENTS 2041633A 9/1980 United Kingdom .
2057180A 3/1981 United Kingdom .

Primary Examiner—Houston S. Bell, Jr.
Attorney, Agent, or Firm—Gaetano D. Maccarone

[57] ABSTRACT

Electrical cells and batteries having lithium anodes and cathodes comprising an organic slurry of $MnO_2$ and carbon particles in an organic solvent in contact with a conductive plastic current collector, and a method of making the cathodes comprising the steps of heating $MnO_2$ to remove absorbed and adsorbed water and water of crystallization, cooling the dehydrated $MnO_2$, dispersing the cooled and dehydrated $MnO_2$ in an anhydrous solvent to form a slurry, depositing the slurry in discrete cathode patches on cell component substrates, and sealing the slurry patches into cells having substantially gas impervious cell enveloping boundaries.

2 Claims, 8 Drawing Figures

LITHIUM BATTERIES WITH ORGANIC SLURRY CATHODES

This invention relates to electrical cells, and particularly to novel lithium batteries of one or more cells, and to methods of making the same.

The high energy density potentially available in a lithium battery has prompted extensive efforts to develop such batteries for a variety of applications, such as watches, hearing aids, cardiac pacemakers, calculators, miniature radios, airborne devices, and the like. However, many problems have been encountered in the course of such development efforts because of the highly reactive nature, not only of metallic lithium, but of many of the cathode, electrolyte and electrolyte solvent materials that have been used or considered for use in conjunction with the lithium anode. Among the factors contributing to the difficulty of manufacturing an entirely satisfactory battery are contaminants that must be excluded, during both the preparation of the components and their assembly, and in the normal use of the completed battery; the potential dangers of expedients employed to exclude such contaminants, as by encapsulation in a rigid metal container that can explode violently under some conditions of use, or misuse, of the battery; and the inclusion of electrochemical components, such as perchlorates, sulfur dioxide, thionyl chloride, or the like, which may react violently to puncture, overheating, or improper charging of the battery. Among the objects of this invention are to facilitate the manufacture of lithium batteries, and to improve the safety and reliability of such batteries.

The above and other objects of the invention are attained by the construction of a lithium battery employing $MnO_2$ as the active cathode material, in which the function of cathode and electrolyte are combined in a cathode slurry of $MnO_2$ and carbon in an organic solvent solution of a suitable electrolyte, preferably $LiAsF_6$.

Considerable attention has been given to $MnO_2$ as a cathode in lithium battery systems, but the manufacture of $MnO_2$ cathodes has hitherto been complicated by the problems involved in either rigorously excluding water, or in dealing with the presence of free or combined water in the completed cell.

In accordance with conventional practice, the cathode has been conceived as a pressed pellet of $MnO_2$ and carbon particles, held together with a binder of polytetrafluoroethylene. In the construction of such a pellet, the first concern is free and combined water contained in the primary raw materials, $MnO_2$ and carbon.

The elimination of water from carbon black, by heating, presents no particular problems. However, commercially available $MnO_2$ contains both relatively lightly held absorbed or absorbed water, and water of crystallization. As described in U.S. Pat. No. 4,133,856, much of this water is preferably removed by heating to temperatures in the range of 350° to 430° C. During this heat treatment, the gamma $MnO_2$ comprising the bulk of the electrolytic $MnO_2$ is for the most part said to be converted to beta $MnO_2$ (see U.S. Pat. No 4,264,689). It is stated in U.S. Pat. No. 4,133,856 that from 1 to 2 percent of water is retained, as water of crystallization, despite this heat treatment, but that heating to temperatures above 430° would be counterproductive because the $MnO_2$ would be partially converted to $Mn_2O_3$, with a consequent loss in electrical capacity.

Whatever success has been achieved in the initial removal of water from the $MnO_2$ by heat treatment is apt to be undone in the preparation of the desired final pellet of bound $MnO_2$ and carbon particles. This final stage in cathode manufacture involves the mixing of the $MnO_2$ with fine particles of carbon black and polytetrafluoroethylene, and molding under extremely high pressures; e.g., from 1000 to 3000 $kg/cm^2$, or 14,000–43,000 psi (United Kingdom patent application No. 2,041,633A), up to 4 $tons/cm^2$, or 51,600 psi (U.S. Pat. No. 4,133,856). These operations are not conveniently carried out in an inert atmosphere. As noted in U.S. Pat. No. 4,133,856, when carried out in air, water again adheres to the $MnO_2$.

Various expedients have been proposed for ameliorating the consequences of water introduced during the cathode pellet forming process. In accordance with U.S. Pat. No. 4,133,856, after the molding process has been completed, the molded cathode is heat treated at temperatures in the range of 200°–350° C. Higher temperatures cannot be employed because the polytetrafluoroethylene binder would be decomposed. In United Kingdom patent application No. 2,041,633A, various problems with this process, including the inability to remove water confined during the molding step, thermal deformation occurring during heat treatment of the molded cathode, and inherent complications of the process, are cited. Instead, it is proposed to heat treat the mixture of $MnO_2$, carbon and polytetrafluoroethylene binder at a temperature between 180° and 350° C. prior to molding, with or without preheating the $MnO_2$ to remove adherent or combined water. The addition of the binder is facilitated by introducing it as an aqueous suspension with a non-ionic dispersing agent, with the water and dispersing agent being removed during the heat treatment step prior to molding. A similar process, in which the cathode is made in the form of an aqueous paste deposited on a support, is described in U.S. Pat. No. 4,216,247. The applied paste is heated in two stages, first to remove the pasting agent and water, and then to fuse the binder. In order to prevent undesired decomposition of the $MnO_2$ during this process, the first heating process is carried out in an oxidizing atmosphere, and the second, higher temperature, stage is conducted in an inert atmosphere, or in a vacuum.

Another approach to the problems caused by water in the lithium battery is to desensitize the system to water. This requires a modification of the electrochemical system employed.

One suggestion, advanced in United Kingdom patent application No. GB 2,057,180A (corresponding to U.S. patent application Ser. No. 70,198, filed on Aug. 27, 1979 now U.S. Pat No. 4,279,972), is based on the thesis that the basic problem with water in a lithium cell is not the reaction between water and lithium, but is caused by the interaction between water, the electrolyte salt in the cell, and the non-aqueous solvent for the electrolyte salt. Thus, it was proposed to either choose an electrolyte salt that would not form a strong oxidizing acid when combined with water, or to choose an electrolyte solvent that would not react with a strong oxidizing acid to form a gaseous product.

As recognized in U.S. Pat. No. 4,264,689, the restriction on the choice of electrolyte or solvent required by the approach just described would rule out either otherwise desirable salts, such as $LiClO_4$ and $LiAsF_6$, or otherwise desirable solvents, such as propylene carbonate. In order to avoid these restrictions while still adhering to the basic premise that lithium metal was not the primary problem, it was proposed to add a salt, such as Li(NO$_3$) or Ca(NO$_3$)$_2$, which would deactivate the active surface of the MnO$_2$ cathode.

In accordance with this invention, all of the various problems involved in the preparation of dry formed bound cathodes are avoided by omitting the binder and discarding the dry formed cathode concept. Instead, the MnO$_2$ is preheated to remove water in the conventional manner, as at 375° C., and then simply mixed with the dried carbon, preferably carbon black, in an anhydrous organic solvent to form a cathode slurry. This slurry is deposited on a cell component, such as a separator or a conductive plastic substrate, in its wet state, and enclosed in the cell by sealing. No heat treatment is required, subsequent to the preliminary treatment of the MnO$_2$, and no molding or paste forming steps, or subsequent formed cathode handling operations, are required.

The practice of the invention will best be understood in the light of the following description, together with the accompanying drawings, of various illustrative embodiments thereof.

Lithium anode assemblies for use in batteries including cathodes in accordance with the invention may be of any conventional construction. However, presently preferred practice is to laminate a sheet of lithium directly to a suitable conductive plastic substrate in a controlled environment, after first providing a freshly exposed lithium substrate at least on the surface of the lithium sheet to which the conductive plastic substrate is to be adhered. This construction, and its advantages, are described in my copending U.S. Application for Letters Patent Ser. No. 341,197, filed concurrently herewith for Lithium Batteries With Laminar Anodes and assigned to the assignee of this invention.

The exposure of a fresh lithium surface has been successfully accomplished by scraping the surface of commercially available lithium foil with a razor blade in an argon atmosphere, to remove at least substantial portions of a normal external coating believed to consist primarily of Li$_2$O, Li$_2$O.CO$_2$, and/or Li$_2$CO$_3$. For the preparation of commercially significant quantities of lithium anode laminate, it is proposed to provide the desired freshly exposed lithium surface by extrusion of a thin lithium foil, in the manner illustrated in FIG. 1.

Figure 1:
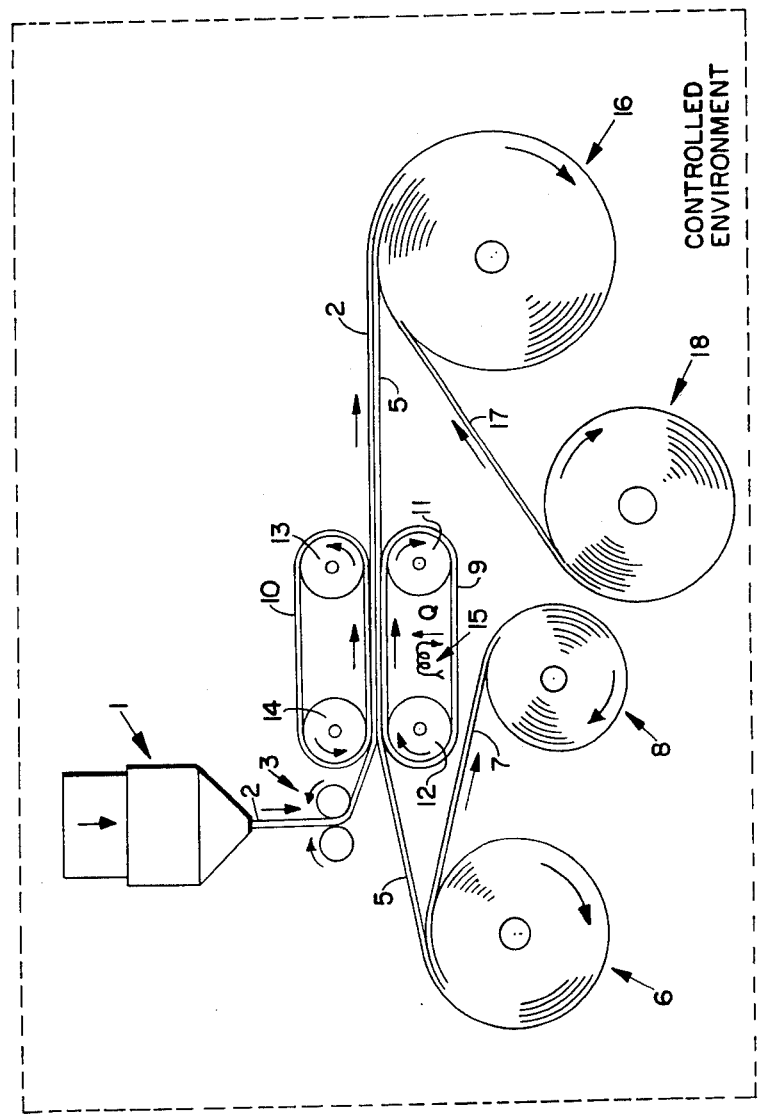
FIG. 1 is a schematic elevational sketch illustrating the manufacture of a laminate of lithium and conductive plastic useful in constructing batteries in accordance with the invention.

Referring to FIG. 1, a billet or ingot of lithium is placed in an hydraulic ram extruder generally designated 1, and there forced through a suitable die, or series of dies, to form an emergent sheet or ribbon 2 of lithium of from 5 to 10 mils (about 0.1 to 0.3 mm) in thickness, and having freshly exposed lithium surfaces. The contaminating surface films to be expected on the original ingot will have been removed, or greatly diluted, in the extrusion process, by reason of the greatly increased surface to volume ratio of the extruded foil 2. If desired, the thickness of the foil 2 may be further reduced, as by driven rolls schematically indicated at 3, to a desired final thickness of from 1 to 3 mils (about 0.02 to 0.08 mm).

The extrusion process, together with any subsequent thickness reducing processes and all further steps in the preparation of cells and batteries in accordance with the invention prior to sealing of the cells, should be carried out in a controlled environment schematically suggested at 4 in FIG. 1. This environment can be an inert gas, such as argon, but in practice will preferably be dry air at a relative humidity of from 1 to 2 percent. The freshly exposed surfaces of the lithium sheet 2 will oxidize in time, even in this environment; thus, it is desirable to carry out the lamination process to be described concurrently with the production of the extruded lithium, rather than, for example, storing the extruded lithium for subsequent lamination.

The extrusion process carried out in the hydraulic extruder 1 is preferably carried out well below the melting point of lithium (180.5° C.), and preferably at about 40° C. (104° F.). The extruder can be kept at constant temperature in the vicinity of this desired operating temperature, as by the circulation of warm water in a suitable heat exchanger formed integral with the extruder housing. At 40° C., the operating pressures in the extruder are expected to be in the vicinity of 2000 p.s.i.

Following the extrusion process and any subsequent further thickness reducing operations, the lithium foil 2 is laminated directly to a sheet of conductive plastic 5. The conductive plastic 5 should be selected from those materials which can be activated thermally to an adhesive state well below the melting point of lithium, which do not contain species reactive with lithium, which can be prepared in the form of a relatively thin web (e.g., from 2 to 10 mils in thickness) without an appreciable population of pinholes, which are relatively resistant to the passage of gases such as N$_2$, O$_2$, CO$_2$, H$_2$O and the like, which possess a relatively low electrical resistivity for current flow across the web in the neighborhood of 1 to 10 ohm centimeters, and which will adhere to metallic lithium with an adequate peel strength of, say, about 0.5 to 2 pounds per inch as measured by an Instron Tester without the aid of a reactive metal adhesive adjunct. A presently preferred material for this purpose is prepared in film form by extrusion of poly(ethylene/vinyl acetate) containing from 15 to 22 percent by weight, and preferably 22 percent by weight, of a high surface carbon black such as Ketjenblack EC, a carbon black produced by AKZO Chemie of the Netherlands. This material can be laminated to metallic lithium in a hot platen press, at a temperature of about 270° F. with an effective dwell time of at least three and preferably not more than nine seconds under moderate pressure sufficient to maintain the webs in intimate contact.

As indicated in FIG. 1, in a production process it is contemplated that the conductive plastic web 5 will be taken from a suitable supply roll 6, on the arbor of which it is wound together with a suitable conventional anti-blocking release sheet 7 of paper, polyester, or the like. The release sheet 7 is taken up on a roll 8 for reuse or disposal.

The lithium web 2 and the conductive plastic web 5 are laminated together by passage through laminating belts 9 and 10, of a material suitable for contact with lithium, such as glass fibers in a polytetrafluoroethylene matrix or the like. The belt 9 is carried on a driven roll 11 and an idler roll 12, and the belt 10 is similarly carried on a driven roll 13 and an idler roll 14. The rolls 11, 12, 13 and 14 are conventionally mounted to cause the belts 9 and 10 to exert pressure on the intermediate webs 2 and 5 to maintain them in intimate contact during the lamination process. Conventional means suggested at 15 are provided to supply heat Q to the belts to maintain the belt 9 at the highest temperature, which may be at or slightly above the melting point of lithium, and the belt 10 at a temperature well below the melting point of lithium, so that the temperature of the lithium component of the laminate will not rise to a level more than 10° to 20° C. below its melting point during the laminating process.

Following the laminating process, the laminate 2,5 may be cooled in any conventional manner, and then either slit and cut immediately for assembly into cells in a manner to be described, or taken up on a roll 16 together with a release sheet 17 of paper, polyester or the like from a supply roll 18, for storage and later use.

FIGS. 2-7 illustrate the assembly of a single cell battery comprising an anode assembly in accordance with the invention. While not necessary to the practice of the invention, it is convenient to assemble the battery on an insulating base sheet 20 (FIGS. 2 and 7), of kraft paper or the like, or most preferably of the material more fully shown and described in U.S. Pat. No. 4,086,400, the latter comprising a laminate of kraft paper, a thermoplastic liquid-impervious resin overlying the paper, and an overlayer on the resin of a heat sealing adhesive 21.

Figure 2:
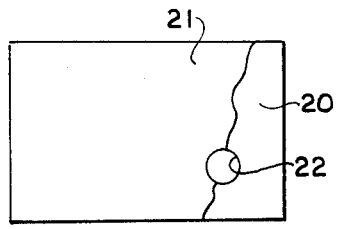
FIG. 2 is a schematic plan sketch, with parts broken away, of a nonconductive laminate useful in the preparation of cells and batteries in accordance with the invention.
Figure 7:
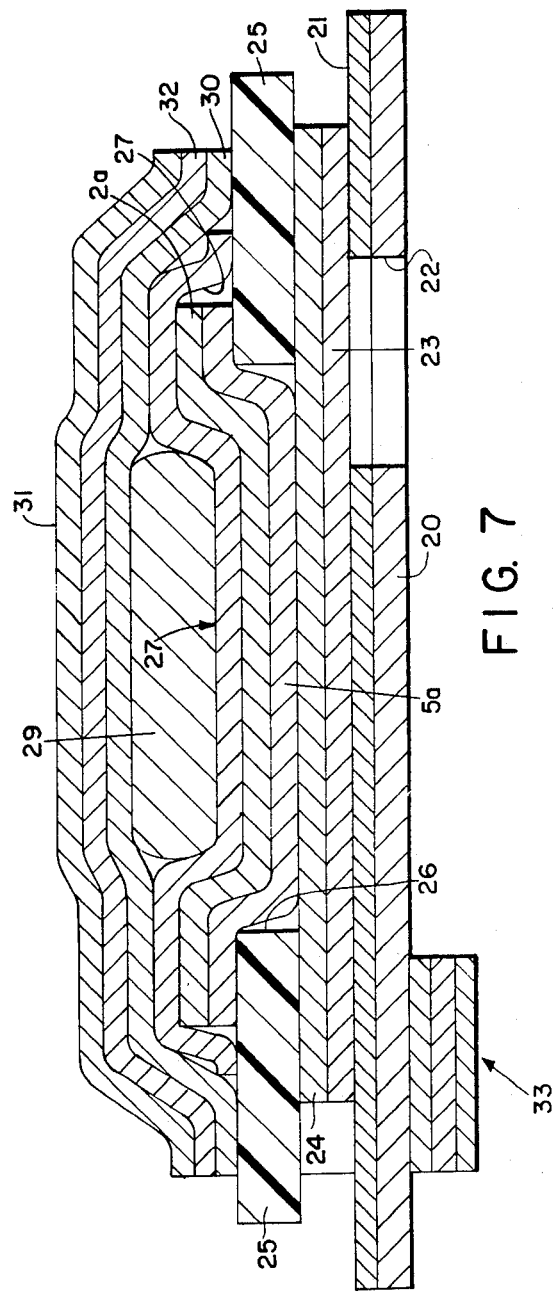
FIG. 7 is a cross-sectional view, on an enlarged scale, showing a completed cell assembled in the manner illustrated in FIGS. 2-5, as seen essentially along the lines 7—7 in FIG. 6.

As shown in FIGS. 2 and 7, the insulating sheet 20 is provided with an aperture 22 to expose the negative terminal of the battery comprising a sheet 23 of metal, preferably a sheet of aluminum foil, for example, of 2 mils in thickness.

The metal terminal sheet 23 is laminated to a selected region surrounding the aperture 22 in the insulating sheet 20, and to the peripheral borders of the sheet 20, but is not necessarily, and preferably is not, laminated to the insulating sheet in other regions.

Figure 3:
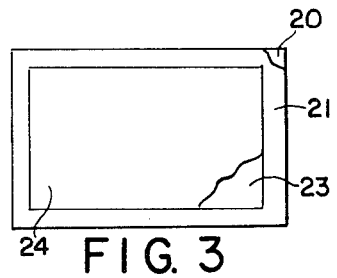
FIG. 3 is a schematic plan sketch similar to FIG. 2, showing additional laminae placed over the laminate of FIG. 2 in the course of assembly of a cell in accordance with the invention.

As shown in FIGS. 3 and 7, the upper side of the metal terminal sheet 23 is preferably coated with a thin layer of conductive priming adhesive 24, typically from 0.1 to 0.8 mils in thickness. Any suitable conductive plastic adhesive adherent to the metal and to the conductive plastic 5 of the anode laminate 2,5 can be employed for this purpose, the most suitable being a composition which is essentially the same as that of the web 5, but which contains a thermoplastic constituent containing reactive groups such as amine, carboxyl, hydroxyl or the like in place of a portion of the ethylene/vinyl acetate constituent of the web 5. One composition found suitable for this purpose is 70 parts by weight of Cabot XC-72 carbon black dispersed in 100 parts by weight of Vitel VPE-307, a polyester resin made and sold by Goodyear Tire and Rubber Co. of Akron, Ohio. This composition is prepared by dissolving the resin in a suitable solvent, such as 80 percent methyl ethyl ketone and 20 percent ethyl acetate, by weight based on the weight of solvent, and dispersing the carbon black in the solution, using sufficient solvent to make a coatable dispersion. This composition is coated on the aluminum, and heated to remove the solvent.

Figure 4:
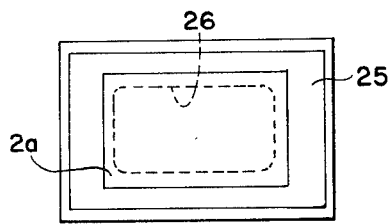
FIG. 4 is a schematic plan sketch similar to FIGS. 2 and 3, showing a cell comprising the components of FIGS. 2 and 3 with the addition of other components.

To the conductive adhesive surface 24 on the aluminum sheet 23 is adhered an insulating frame 25 as seen in FIGS. 4 and 7. The frame 25 is formed with a central aperture 26 which serves to receive other electrochemically active components in a manner to be described.

The frame 25 may be of any suitable conventional electrically insulating material that is inert to the constituents of the cell. One material that has been successfully employed is a 5 mil vinyl, specifically a poly(vinyl chloride/vinyl acetate) containing 85 percent vinyl chloride and 15 percent vinyl acetate by weight, coated on its external surfaces with a poly(ethylene/acrylic acid) adhesive. A presently preferred material is nylon coated with a poly(ethylene/vinyl acetate) adhesive.

An anode electrode structure comprising a sheet 5a of conductive plastic over which a layer 2a of lithium has been laminated in the manner described above is located principally within the aperture 26 formed in the frame 25 and has external borders extending around and over the aperture 26 (FIG. 4), with the conductive plastic sheet 5a being laminated to the edges of the frame 25 around the borders of the aperture 26 and the conductive plastic sheet 5a being laminated to the conductive primer 24 on the conductive metal end terminal sheet 23 as shown in FIG. 7.

Overlying the anode layer 2a in FIG. 7 is a separator 27 (FIGS. 5 and 7) of any conventional material, approximately 2 to 10 mils in thickness. Separators suitable for use in lithium batteries are well known in the art, among those to be considered being polyolefins such as polypropylene, mixtures of polyolefins with rubbers such as sytrene-butadiene rubber, together with additives such as $TiO_2$ and the like. A suitable microporous polypropylene separator is sold under the trademark Celgard by Celanese Plastics Co. of Greer, S.C. A presently preferred material is a 2 mil microporous polyolefin separator material of the kind described in U.S. Pat. No. 4,287,276, which incorporates a nonionic wetting agent.

Figure 5:
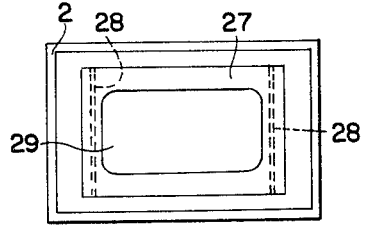
FIG. 5 is a schematic plan sketch similar to FIGS. 2-4, showing a cell in a later stage of manufacture.

The separator 27 is preferably not fully attached along its periphery to the frames 25, but is only selectively adhered thereto, as by means of stripes of adhesive 28 on either side of the separator along two sides thereof, as shown in dotted lines in FIG. 5. The adhesive stripes 28 may be of any selected adhesive material inert to the cell constituents, and for example, of poly(ethylene/vinyl acetate), a polyamide, or the like. Alternatively, and as presently preferred, where the frames are of the type described above with an external coating of a heat activated adhesive, the separator may be heat-tacked to the frame in discrete regions, as at the corners, to provide sufficient adhesion to carry it through the assembly process.

The components just described, comprising the insulating sheet 22, the metal terminal sheet 23, the frame 25, the conductive plastic layer 5a with its adherent layer 2a of lithium, and the separator 27, are preferably formed in a manner described in copending U.S. Application for Letters Patent Ser. No. 295,269, filed on Aug. 24, 1981 by Paul A. Plasse for Laminar Batteries and Methods of Making the Same, assigned to the assignee of this invention and incorporated herein by reference, as a part of a single composite web which acts as an integral subassembly in the process of manufacturing batteries. Overlying the separator 27 in this structure, as seen in FIG. 7, is a cathode 29.

In accordance with the invention, the cathode is formed as a slurry of manganese dioxide and carbon particles in an electrolyte solution in an organic solvent containing a lithium salt as the ionically conductive species. Suitable cathode slurry compositions comprise from 50 to 100 parts by weight of propylene carbonate and from 0 to 50 parts by weight of 1,2 dimethoxyethane, based on the weight of solvent, as the organic solvent, with $LiAsF_6$ in concentrations of from 0.05 to 2.00 molal, or $LiClO_4$ in concentrations of from 0.65 to 1.97 molal, as the electrolyte. The electrolyte solution may comprise from 35 to 59 percent by weight, based on the weight of slurry, of a dispersion in the solution of $MnO_2$ and carbon black in weight ratios of $MnO_2$ to carbon of from 8 to 1 to 24 to 1.

Specific cathode slurry compositions that have been successfully employed are given in the following examples:

| Component | Weight Percent |
|---|---|
| EXAMPLE 1 | |
| $LiClO_4$ | 3.61 |
| Propylene Carbonate | 15.66 |
| 1,2-Dimethoxyethane | 15.66 |
| Carbon | 2.60 |
| $MnO_2$ | 62.46 |
| | 100.0 |
| EXAMPLE 2 | |
| $LiClO_4$ | 4.61 |
| Propylene Carbonate | 16.56 |
| 1,2-Dimethoxyethane | 16.56 |
| Carbon | 3.69 |
| $MnO_2$ | 58.58 |
| | 100.0 |
| EXAMPLE 3 | |
| $LiAsF_6$ | 8.98 |
| Propylene Carbonate | 32.01 |
| 1,2-Dimethoxyethane | 13.72 |
| Carbon | 5.03 |
| $MnO_2$ | 40.27 |
| | 100.0 |
| EXAMPLE 4 | |
| $LiAsF_6$ | 5.70 |
| Propylene Carbonate | 16.37 |
| 1,2-Dimethoxyethane | 16.37 |
| Carbon | 3.65 |
| $MnO_2$ | 57.91 |
| | 100.0 |
| EXAMPLE 5 | |
| $LiAsF_6$ | 7.94 |
| Propylene Carbonate | 40.00 |
| Carbon | 5.80 |
| $MnO_2$ | 46.26 |
| | 100.0 |

Examples 2 and 4 are presently preferred cathode forumlations.

During the preparation of cathode slurries of the compositions given above, the (Kerr-McGee) $MnO_2$ was heated at 375° C. in a furnace for 24 hours under a continuous stream of argon and then stored under vacuum in a glass side arm flask. The $MnO_2$ was redried under vacuum for 6 hours at 160°-170° C., using an oil bath, before introduction into the batteries. The carbon (Cabot XC-72R) was heated to 200° C. for 24 hours in a furnace and then stored under vacuum in a glass side arm flask. The carbon was redried under vacuum at 160°-170° C., using an oil bath, for 6 hours before use in batteries. The $LiClO_4$ was dried under vacuum at 180° C., using an oil bath, for 18 hours and then stored under vacuum in a glass side arm flask. $LiAsF_6$ which included traces of water as indicated by an infrared spectrum was dried in the same manner; if no water was found, this material was used as received from the manufacturer.

The propylene carbonate was refluxed over molecular sieves with 3 Å pores for a period of twenty four hours, and then distilled at 73°-75° C. under a vacuum corresponding to an absolute pressure of about 0.1 torr. It was then degassed by freezing, evacuation and thawing. The degassing procedure would probably be unnecessary in a production environment, using an atmosphere of dry air at atmospheric pressure. The 1,2 dimethoxyethane was also refluxed over molecular sieves for 24 hours, and then distilled at 83°-84° C. at atmospheric pressure.

Figure 6:
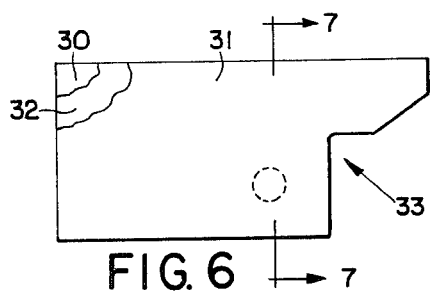
FIG. 6 is a view similar to FIGS. 2-5, showing a cell in a still later stage of manufacture.

Over the cathode 29 is placed a composite end terminal layer comprising, as shown in FIGS. 5, 6 and 7, a sheet of conductive plastic 30, of the same composition as the layer 5a, and for example, of 4 mils in thickness, laminated to a cathode end terminal sheet 31 of metal, preferably of aluminum foil 2 mils in thickness and primed on the side adjacent the conductive plastic layer 30 with a thin coat of conductive plastic adhesive 32 employed for the purpose of adhering the conductive plastic sheet 30 to the metal terminal 31 in a manner known in the art per se and described above.

As indicated in FIGS. 6 and 7, the end terminal laminate comprising the conductive plastic layer 30, the aluminum sheet 31, and the intermediate conductive plastic priming layer 32 is preferably formed with an extension 33 which is folded around the battery to present a positive terminal on the same side as the negative terminal exposed by the aperture 22. Alternatively, this extension can be omitted, as to facilitate stacking batteries in series to provide a higher operating voltage.

Following assembly, the battery of FIG. 7 may be sealed under vacuum by heat and pressure applied around the edges, in the manner described in the above-cited U.S. Application Ser. No. 295,269 except that lower temperatures consistent with the materials employed should be utilized.

Commercially available nominally pure lithium foil normally has a surface coating of $Li_2O$, $Li_2O.CO_2$ or the like, which does not preclude lamination to a conductive plastic substrate of the kind described above. However, it has been found that markedly improved results can be attained if the surface of the lithium that is to be placed in contact with the conductive plastic is freshly exposed, as by cleaning with a razor blade, shortly before the lamination is carried out. The surface of the lithium that is to be in contact with the electrolyte in the assembled cell is not critical in this regard, as it has been found to make no appreciable difference in the electrical performance of the cell whether or not this surface is cleaned.

Multiple cell batteries may be made by stacking single cell batteries of the type described above. Integrally packaged laminar multiple cell lithium batteries with reasonable shelf lives cannot be manufactured with a construction analogous to that described in the above-cited U.S. Application Ser. No. 295,269. However, as more fully described in my copending U.S. Application for Letters Patent Ser. No. 341,196, filed concurrently herewith for Laminar Multicell Lithium Batteries now U.S. Pat. No. 4,429,026 and assigned to the assignee of this invention, such batteries can be manufactured successfully if the construction next to be described in connection with FIG. 8 is employed.

Figure 8:
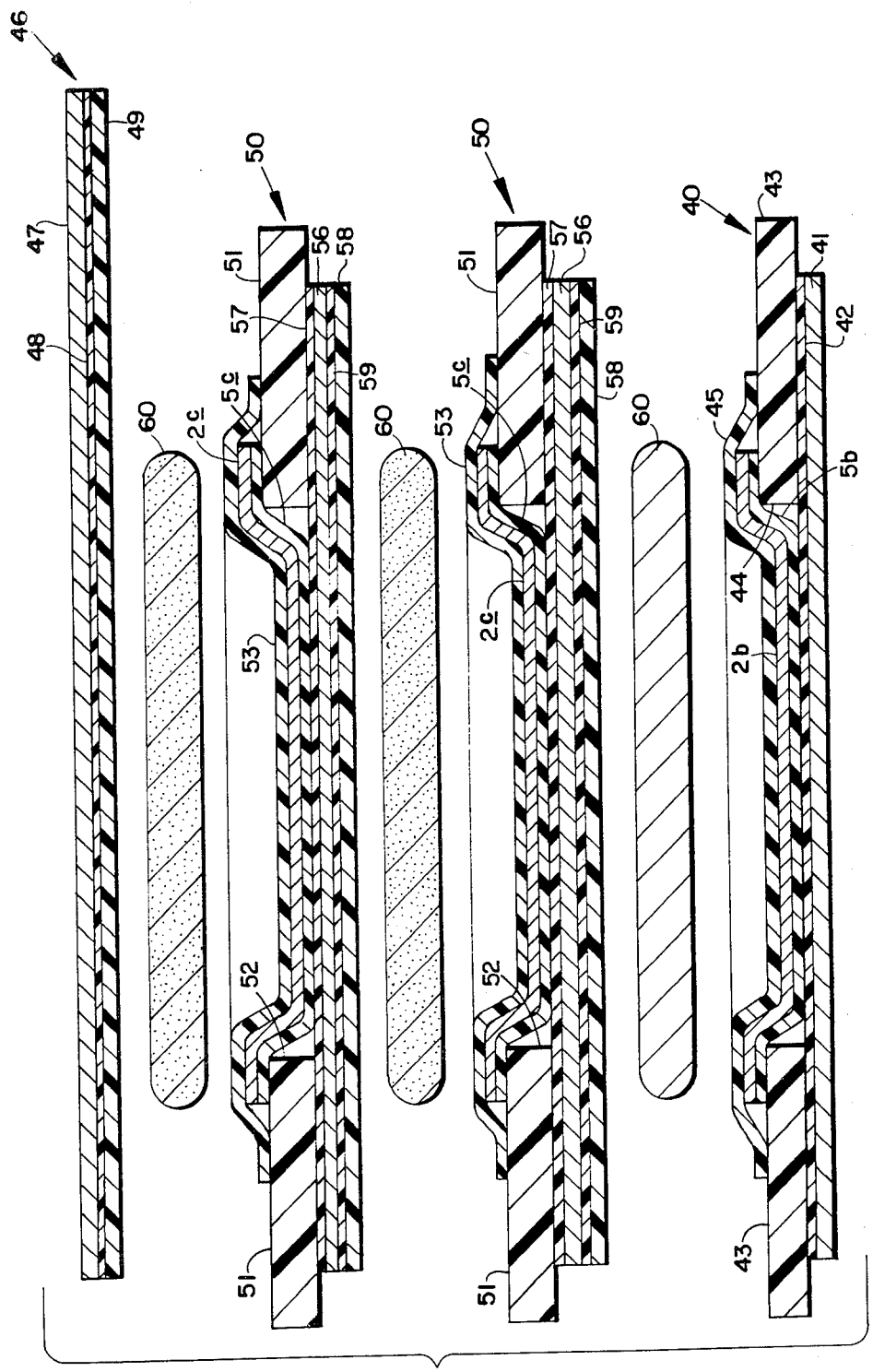
FIG. 8 is an exploded schematic cross-sectional elevational view of a multicell battery comprising cathode assemblies in accordance with the invention.

FIG. 8 shows an exploded view of a three cell lithium battery. As will be apparent to those skilled in the art from the following description, this construction is readily adapted to the manufacture of batteries having any number of cells larger than one.

Referring to FIG. 8, the battery may comprise an anode end terminal half cell 40 which is identical with that described above in connection with FIG. 7. Specifically, the anode end terminal collector may comprise a sheet 41 of a suitable conductive metal, such as 2-mil aluminum or the like, coated with a thin layer 42 of a conductive plastic adhesive such as that comprising the layer 24 in FIG. 7.

To the conductive adhesive surface 42 on the aluminum sheet 41 is adhered an insulating frame 43, which may be identical with the frame 25 described above in connection with FIGS. 4 and 7. The frame 43 is formed with a central aperture 44, corresponding to the aperture 26 in the frame 25.

An anode electrode structure comprising a sheet 5b of conductive plastic over which a layer 2b of lithium has been laminated in the manner described above is located principally within the aperture 44 formed in the frame 43 and has external borders extending around and over the aperture 44 (FIG. 8), with the conductive plastic sheet 5b being laminated to the edges of the frame 43 around the borders of the aperture 44 and the conductive plastic sheet 5b being laminated to the conductive primer 42 on the conductive metal end terminal sheet 41, identically as for the corresponding elements described above in connection with FIG. 7.

Overlying the anode layer 2b in FIG. 8 is a separator 45, which may be the same as the separator 27 in FIG. 7. The separator 45 is preferably not fully attached along its periphery to the frame 43, but is only selectively adhered thereto in the manner described above in connection with FIG. 5.

The components of the end terminal half cell assembly 40 just described, comprising the insulating sheet 22, the metal terminal sheet 41, the frame 43, the conductive plastic layer 5b with its adherent layer 2b of lithium, and the separator 45, are preferably adhered to an insulating sheet such as the sheet 22 described above, not shown in FIG. 8, to provide an insulating base for the battery in the manner described above for a single cell battery.

The cathode end terminal 46 of the battery of FIG. 8 is formed as a laminate of metal foil 47, such as aluminum 2 mils in thickness, coated with a thin coat 48 of a conductive plastic adhesive and thereby laminated to a sheet 49 of conductive plastic 49. This laminate corresponds in structure and function to the end terminal layer comprising the metal end terminal sheet 31 primed with conductive plastic adhesive 32 and laminated to the conductive plastic sheet 30 as described above in connection with FIGS. 5, 6 and 7. In the same manner, the end terminal 46 may be provided with a projection 49 at one end to be folded around to the other side of the battery, to present the positive terminal on the same side of the battery as the negative terminal.

Between the anode end terminal half cell subassembly 40 and the end terminal 46 at the cathode end of the battery are $n-1$ intercell subassemblies 50, where n is the total number of cells in the battery. Each of the intercell subassemblies 50 may be a subassembly such as 40, to which a layer of conductive plastic is adhered for purposes to appear.

That portion of each subassembly 50 which may be identical with the end terminal subassembly 40 comprises a frame 51, which may be identical with the frame 43 and formed with a central aperture 52 corresponding to the aperture 44 in the frame 43; an anode assembly comprising a lithium foil anode 2c laminated to a conductive plastic sheet 5c corresponding in structure and function to the elements 2b and 5a; a separator 53 corresponding to the separator 45; and a solvent barrier layer 56 which may be of any suitable material which is both electrically conductive and essentially impermeable to the nonaqueous solvent included in the cathode slurry, but which in a preferred embodiment comprises a sheet of metal foil, such as 2 mil aluminum foil, identical with the metal terminal sheet 41.

As in the subassembly 40, the sheet 56 is suitably adhered to the frame 51 and to confronting regions of the conductive plastic sheet 5c, as by an intermediate layer of conductive plastic adhesive 57, from 0.1 to 0.8 mils in thickness. As in the corresponding structures previously described, the edges of the conductive plastic sheets 5c are adhered to the borders of the frames 51 around the apertures 52, and the separators 53 are selectively adhered to portions of the frames 51 only in discrete regions.

To each of the solvent barrier sheets 56 is adhered a sheet of conductive plastic 58, as by an intermediate layer 59 of conductive plastic adhesive. These layers 58 and 59 may correspond in structure and composition to the layers 47 and 48 of the end terminal assembly 46; e.g., the layer 58 may be from 3 to 10 mils in thickness, and preferably from 4 to 6 mils, and the layer 59 from 0.1 to 0.8 mils, and preferably about 0.2 mils, in thickness.

The battery of FIG. 8 is completed by cathode slurry deposits 60, which may correspond in amount, dimensions and composition to the cathode 29 in FIG. 7. The battery may be assembled by adhering the metal terminal sheet 41 forming the base of the subassembly 40 to a nonconductive web such as the base sheet 22, 21 in FIG. 7; depositing the first cathode 60 on the separator 45, as by extrusion; next adding in sequence a subassembly 50, cathode 60, another subassembly 50, another cathode 60, and so on until the assembly is terminated by an end terminal 46. The battery is then sealed under vacuum by applying heat and pressure to the edges, to effect a seal between confronting faces of the frames 43 and 51 and the conductive plastic layer 49 of the end terminal 46.

The gross structural difference between a lithium battery constructed as just described in connection with FIG. 8 and a Leclanche battery constructed in accordance with such practices as are described, for example, in the above-cited copending U.S. patent application Ser. No. 295,269, apart from differences in chemistry, is that in Leclanche structures, the intercell anode assemblies generally corresponding to the assemblies 50 in FIG. 8 lack the solvent barrier layers 56, the layers of conductive plastic adhesive 57 and 59 on both sides of the layers 56, and the conductive plastic sheets 58 of FIG. 8.

In the subassemnblies 50 of FIG. 8, the frames 51 perform their normal function of providing an electrically insulating barrier against the intercell and intercell shorts, and the conductive plastic layers 5c serve to provide electronically conducting, electrochemically isolating barriers. These elements alone would apparently provide sufficient intercell isolation; however, batteries constructed without the additonal barrier layers 56 have been found to develop very high internal impedances. The cause of high impedance in these structures, though perhaps not established beyond peradventure, is speculated to be a relatively subtle permeation of the conductive plastic layers such as 50, in the absence of the barrier layers 56, by organic solvents in the cathode slurry, and particularly by reactive solvents such as propylene carbonate. Such permeation might result in the formation of a highly nonconductive barrier layer; e.g., of $Li_2CO_3$, $Li_2O.CO_2$, or the like; on the lithium anode. The degree of such permeation, if any, is not such as to affect the end terminal assemblies such as 46 in FIG. 8, a finding which is harmonizable with the above assumption either on the theory that there is no appreciable reaction between aluminum and the solvents, or that any reaction products of the interaction between aluminum and solvents such as propylene carbonate would be self-limiting films so thin as to oppose no appreciable barrier to electronic conduction. In any event, the interposition of effective solvent barriers such as 56 has been found to eliminate the high impedance problem.

In the subassemblies 50 in FIG. 8, the solvent barrier 56, which is preferably of aluminum, does not perform simply as a highly conductive current collector, as does the sheet 41; it would be superfluous if that was its only function. Rather, it is to provide an essentially complete barrier against the passage of organic solvent from a cathode in one cell to the anode in the next adjacent cell.

The accompanying layer 58 of conductive plastic is needed to isolate the barrier layer 56 from the adjacent cathode 60, and the conductive plastic layers 57 and 59 simply serve to adhere the various layers together sufficiently to prevent delamination in service, while providing a low resistance to the flow of electrical current.

As more fully described in my copending U.S. Application for Letters Patent Ser. No. 340,970, filed concurrently herewith for Hermetically Sealed Lithium Batteries and assigned to the assignee of this invention, which is incorporated herein by reference, the shelf life of lithium batteries with $MnO_2$ cathodes can be considerably enhanced by a partial electrical discharge of the battery during or immediately after electrochemical assembly (i.e., at least within a few hours of ECA), prior to storage, shipment and sale of the batteries. For this purpose, the battery can be connected to a resistor suitable for draining about 20 milliamperes for a time sufficient to remove from 1 to 3 percent of the total capacity of the battery. This practice is preferably followed as a final step in the preparation of batteries in accordance with the invention.

While the invention has been described with respect to the details of specific illustrative embodiments, many changes and variations will become apparent to those skilled in the art upon reading this description, and such can obviously be made without departing from the scope of the invention.

Having thus described the invention, what is claimed is:

1. The method of making a cathode, comprising the steps of dispersing dewatered $MnO_2$ and carbon black in a substantially anhydrous solution of a lithium salt in an organic solvent to form a slurry, said slurry being free of any binder material, and depositing a quantity of said slurry on the surface of a flat electrolyte permeable separator.

2. The method of making a lithium battery comprising the steps of dewatering $Mno_2$ by heat treatment, mixing said dewatered $Mno_2$ and carbon black with a substantially anhydrous solution of a lithium salt in an organic solvent to form a slurry, said slurry being free of any binder material, placing a thin flat electrolyte permeable separator in contact with a thin flat sheet of lithium, depositing a quantity of said slurry on said separator on the side of said separator opposite said lithium sheet, and encapsulating said slurry deposit, said separator and said lithium sheet in a solvent impermeable enclosure.

* * * * *